United States Patent
DeGrazia

(10) Patent No.: US 11,021,182 B1
(45) Date of Patent: Jun. 1, 2021

(54) ANTIMICROBIAL HANDLE COVER

(71) Applicant: iGrip Technologies, Inc., Huntington, NY (US)

(72) Inventor: Michael V. DeGrazia, Huntington, NY (US)

(73) Assignee: iGrip Technologies, Inc., Huntington, NY (US)

( * ) Notice: Subject to any disclaimer, the term of this patent is extended or adjusted under 35 U.S.C. 154(b) by 0 days.

(21) Appl. No.: 17/088,544

(22) Filed: Nov. 3, 2020

(51) Int. Cl.
*B62B 5/06* (2006.01)
*E05B 1/00* (2006.01)
*A45C 13/00* (2006.01)
*A45C 3/06* (2006.01)
*B25G 1/10* (2006.01)

(52) U.S. Cl.
CPC ............... *B62B 5/069* (2013.01); *A45C 3/06* (2013.01); *A45C 13/001* (2013.01); *E05B 1/0061* (2013.01); *B25G 1/10* (2013.01)

(58) Field of Classification Search
CPC ......... B62B 5/069; A45C 3/06; A45C 13/001; E05B 1/0061; B25G 1/10
See application file for complete search history.

(56) References Cited

U.S. PATENT DOCUMENTS

| | | | |
|---|---|---|---|
| 2,803,849 A | 8/1957 | Peters | |
| 4,360,493 A * | 11/1982 | Kramer, Sr. | B29D 23/001 264/292 |
| 4,805,937 A | 2/1989 | Boucher | |
| 5,209,372 A * | 5/1993 | Norwood | B65D 1/0292 215/11.3 |
| 5,427,392 A * | 6/1995 | Duer | B62B 5/06 150/154 |
| 5,429,377 A * | 7/1995 | Duer | B62B 5/06 150/154 |
| 5,722,672 A | 3/1998 | Frederick | |
| 5,820,142 A * | 10/1998 | Duer | B62B 5/069 280/33.992 |
| 5,953,790 A | 9/1999 | Auxier | |
| 6,543,794 B1 | 4/2003 | Tyree | |
| 6,869,085 B2 | 3/2005 | Pettigrew | |
| 6,904,615 B2 * | 6/2005 | Kobe | B25G 1/10 2/161.8 |

(Continued)

FOREIGN PATENT DOCUMENTS

GB 2501543 A 10/2013

OTHER PUBLICATIONS

Systec POS-Technology Inc., "ClipOn XT," 2020, 3 pages, https://www.systec.com/us/products/advertising-handles/clipon-xt and https://www.systec.com/us.systec.com/downloads/cliponxt_us.pdf.

(Continued)

*Primary Examiner* — Jacob B Meyer
(74) *Attorney, Agent, or Firm* — Doster Greene, LLC

(57) ABSTRACT

A handle cover according to various exemplary embodiments can include a collapsible corrugated tube comprising a tube body of a tubular shape defining spiral corrugations having spiral ridges and spiral grooves, which are arranged alternately running transverse to a length of the tube. A slot is formed longitudinally along the length of the tube. At least one antimicrobial agent is impregnated throughout the tube for inhibiting growth of microbes.

24 Claims, 11 Drawing Sheets

(56) References Cited

U.S. PATENT DOCUMENTS

| | | | | |
|---|---|---|---|---|
| 7,914,466 B2* | 3/2011 | Davis | | A61M 25/09025 |
| | | | | 600/585 |
| 9,969,521 B2* | 5/2018 | Shen | | B29C 51/42 |
| 10,166,158 B2* | 1/2019 | Trinder, II | | A61G 7/0507 |
| D860,729 S* | 9/2019 | Shen | | D7/512 |
| 10,422,158 B2* | 9/2019 | Strombeck | | E05B 1/0061 |
| 2002/0092132 A1 | 7/2002 | Kessler | | |
| 2004/0021279 A1 | 2/2004 | Sobo | | |
| 2006/0151660 A1* | 7/2006 | Stringer | | B65D 85/672 |
| | | | | 242/588.3 |
| 2007/0245850 A1* | 10/2007 | Ramali | | A47B 95/02 |
| | | | | 74/551.9 |
| 2007/0267828 A1* | 11/2007 | Egizi | | B62B 5/069 |
| | | | | 280/33.992 |
| 2008/0191435 A1* | 8/2008 | Guercia | | B62B 3/1408 |
| | | | | 280/33.992 |
| 2010/0236674 A1* | 9/2010 | Badgley | | E05B 1/0069 |
| | | | | 150/154 |
| 2011/0226801 A1* | 9/2011 | Smith-Heskel | | A61L 2/18 |
| | | | | 222/1 |
| 2012/0148783 A1* | 6/2012 | Kunkleman | | B62B 5/069 |
| | | | | 428/43 |
| 2012/0240307 A1* | 9/2012 | Terrell | | B62B 5/069 |
| | | | | 2/158 |
| 2014/0130929 A1* | 5/2014 | Elliott | | F16L 11/111 |
| | | | | 138/121 |
| 2016/0288812 A1* | 10/2016 | Bailey | | B62B 5/069 |
| 2016/0297461 A1 | 10/2016 | Barr-Perea | | |
| 2020/0385613 A1* | 12/2020 | Hackemeyer | | A01N 59/00 |

OTHER PUBLICATIONS

Kleenwraps, https://www.kleenwraps.com/, 8 pages.

* cited by examiner

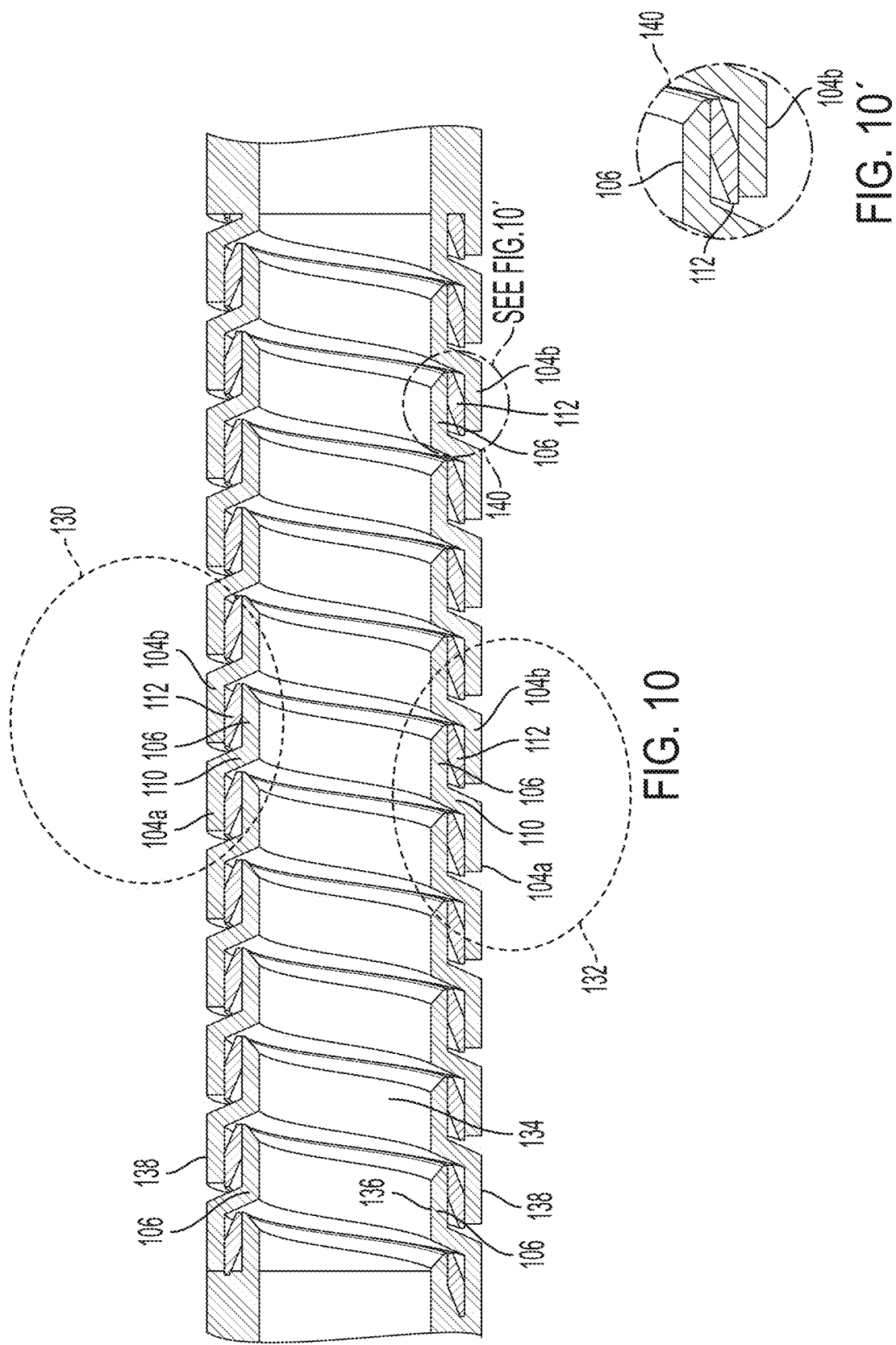

ANTIMICROBIAL HANDLE COVER

FIELD OF THE INVENTION

The present disclosure relates generally to reusable, protective covers with antimicrobial properties for the purpose of reducing the ability of microorganisms to adhere, survive, and grow on frequently touched surfaces, such as handles.

BACKGROUND OF THE INVENTION

Microorganisms, including, for example, bacteria, fungi, and viruses, are ever present in our environment. Pathogens are microorganisms that are capable of causing infectious diseases, such as influenza (flu) and coronavirus disease 2019 (COVID-19). Pathogens can spread through contact between people and touched surfaces. Surfaces may become contaminated by airborne organisms, landing on the surface or through touch contamination. Thus, through airborne transmission or contact transmission, pathogens can contaminate surfaces, such as handles, handrails and doorknobs—and subsequently infect others who touch those surfaces.

Frequently touched objects, such as shopping cart handles, which come into direct contact with the users' hands can act as source of contamination of potentially pathogenic microorganisms. Shopping carts are used daily by multiple individual users. The user may acquire pathogens following direct contact with the contaminated handle of the shopping cart. Often, shopping cart handles are handled by the hands or mouths of children. Children can become contaminated when they come into contact either directly by surface-to-mouth contact or indirectly by contaminated fingers and subsequent hand-to-mouth contact.

Microorganisms' cross-transmission between frequently touched surfaces, such as shopping cart handles, and users can lead to infections wherein pathogenic microbes invade and multiply within an individual. The infection may result in a disease that causes damage to the individual's vital functions or systems. For example, a person can get COVID-19 by touching a surface or object that has the virus on it and then touching their own mouth, nose or possibly eyes. Contaminated hands are an efficient means by which infection can be transmitted, with viral particles being deposited in the mouth, nose, or eyes.

Studies have shown that contaminated surfaces of shopping carts are hidden reservoirs for the spread of microbial agents in public. For instance, according to one study, potentially dangerous bacteria were found on 50%-75% of shopping carts. Most microorganisms, and more specifically bacteria which can multiply within hours on a surface, can remain viable on surfaces for an extremely long time. According to the U.S. Center for Disease Control and Prevention (CDC), SARS-CoV2, which causes COVID-19, may remain viable for hours to days on surfaces made of a variety of materials.

Bacteria may grow and persist in the environment as free floating (planktonic) cells in liquids or attached to surfaces as biofilms. Biofilms form when bacteria adhere to surfaces. Biofilms are formed when fast-mutating versions of free-floating planktonic bacteria attach to a surface where they multiply, colonize, and form an extracellular matrix covering to protect the colonies. Thus, bacteria in biofilms have the capacity to survive and may serve as a reservoir of human pathogenic bacteria. Biofilms are very difficult to get rid of and can result in serious infections. Some studies indicate that 1,500 times more antibiotic is required to kill a biofilm than is necessary to kill planktonic bacteria. Therefore, one key to preventing biofilms is to prevent the planktonic bacteria from colonizing on the surfaces of devices.

Unfortunately, biofilm formation is commonplace on shopping cart handles. Exposure to such microorganisms through skin-surface contact may result in infection that compromise the health of the public. Biofilms can be difficult to remove and cause risks to human health. Routine cleaning of shopping cart handles with antibacterial wipes may not be effective in elimination of all microorganisms, especially biofilm that encases the worst microbes.

Since the contamination of shopping cart handles is well-known, a number of reusable sanitary covers for shopping cart handle covers have been designed. However, use of such conventional shopping cart handle covers has a serious drawback in that some microorganisms can be transmitted from the handle and remain on the handle cover during storage. The microorganism attaches to the surface of the handle cover and the biofilm develops and continues to grow on the surface of conventional shopping cart handle covers during storage. Thus, contamination of some conventional reusable handle covers is a problem. Controlling formation of biofilms on shopping cart handles could result in less infection of individuals in public.

Therefore, a need exists for a manner to prevent the spread of pathogens, reduce infections, and effectively kill biofilms relating from the use of shopping cart handles. A need exists for a handle cover for shopping carts that delivers antimicrobial properties and provides prolonged, long-lasting efficacy against microorganisms without increasing chemical additives.

SUMMARY OF THE INVENTION

In certain embodiments, the system and method provide a handle cover having enhanced antimicrobial properties that will kill infectious microorganisms on the handle cover, on the handle and on the hands of the user that touches the handle cover.

A handle cover for shopping carts according to various exemplary embodiments can include a collapsible corrugated tube comprising a tube body of a tubular shape defining spiral corrugations having spiral ridges and spiral grooves, which are arranged alternately running transverse to a length of the tube. A slot is formed longitudinally along the length of the tube. At least one antimicrobial agent is impregnated throughout the tube for inhibiting growth of microbes.

A handle cover for shopping carts according to various exemplary embodiments can include a collapsible corrugated tube comprising a tube body of a tubular shape defining spiral corrugations having spiral ridges and spiral grooves, which are arranged alternately running transverse to a length of the tube. A slot is formed longitudinally along the length of the tube. A surface of the tube has a biocidal, biostatic, or antimicrobial effect to inhibit or reduce growth of microbes.

BRIEF DESCRIPTION OF THE DRAWINGS

FIG. 10 is a longitudinal cross-sectional view of the antimicrobial handle cover in a collapsed or unstretched position according to the present teachings.

FIG. 10' is a close-up cross-section view of a portion of the antimicrobial handle cover in the collapsed or unstretched position of FIG. 10.

Figure 1:
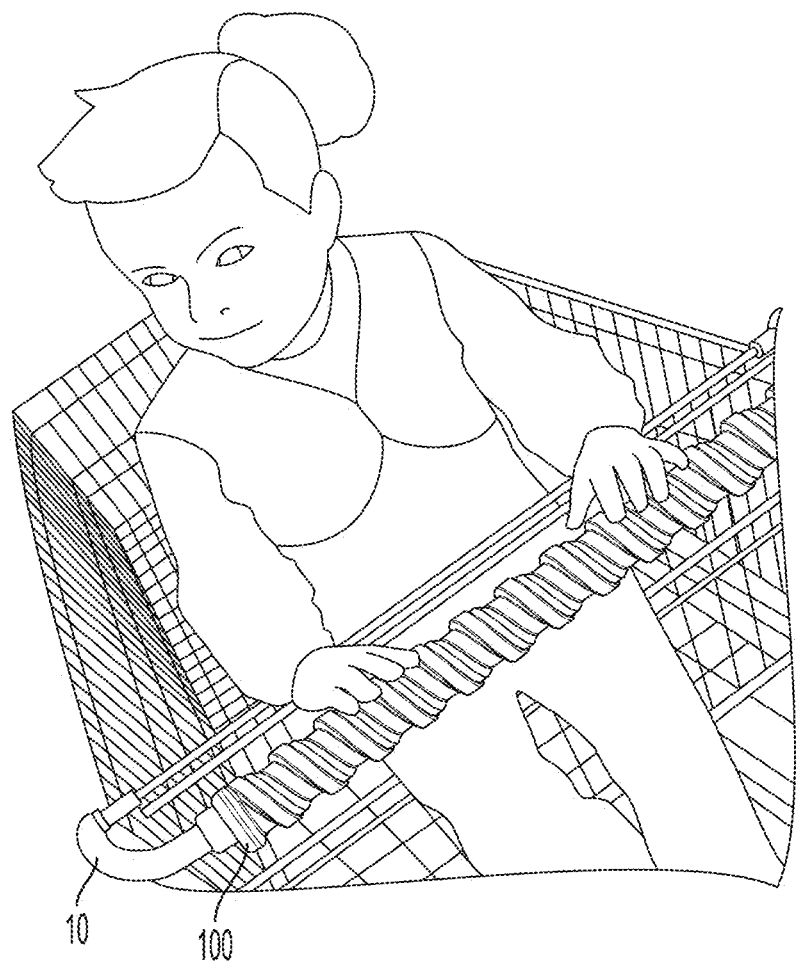
FIG. 1 depicts an antimicrobial handle cover in use on a conventional shopping cart handle according to the present teachings.

The present disclosure may take form in various components and arrangements of components, and in various process operations and arrangements of process operations. The present disclosure is illustrated in the accompanying drawings, throughout which, like reference numerals may indicate corresponding or similar parts in the various figures. The drawings are only for purposes of illustrating preferred embodiments and are not to be construed as limiting the disclosure. Given the following enabling description of the drawings, the novel aspects of the present disclosure should become evident to a person of ordinary skill in the art.

DETAILED DESCRIPTION OF VARIOUS EMBODIMENTS

The following detailed description is merely exemplary in nature and is not intended to limit the applications and uses disclosed herein. Further, there is no intention to be bound by any theory presented in the preceding background or summary or the following detailed description.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limit the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value ±5%. Therefore, for example, about 100 nm, could mean 95-105 nm. At the very least, each numerical parameter should at least be construed in light of the number of reported significant digits and by applying ordinary rounding techniques.

All documents cited are, in relevant part, incorporated herein by reference; the citation of any document is not to be construed as an admission that it is prior art with response to the present invention.

Various embodiments provide an antimicrobial handle cover that will kill infectious microorganisms on a handle cover, on a handle, and on the hands of a user that touches the handle cover. The antimicrobial properties of the handle cover will mitigate the transfer of infection from the handle to the user.

As used herein, the term "antimicrobial" (or "biocidal") refers to an agent intended to disinfect, sanitize, reduce, or mitigate growth or development of microbiological organisms or protect objects or surfaces from contamination, or deterioration caused by microorganisms. The term "microorganisms", as used herein, refer to any prokaryotic or eukaryotic microscopic organism, including without limitation, one or more of bacteria (e.g., motile or vegetative, Gram positive or Gram negative), bacterial spores or endospores, algae, fungi (e.g., yeast, filamentous fungi, fungal spores), mycoplasmas, viruses, and protozoa, as well as combinations thereof. "Biocide" or "germicide" refers to chemical agents that kill microorganisms. When a killing action is implied, the suffix -cide (e.g. biocide, germicide, bactericide, virucide, sporicide) is used herein, while -static (e.g. biostatic, bacteriostatic, virostatic, sporostatic) is used herein when an organism's growth is merely inhibited or it is prevented from multiplying.

Thus, "antimicrobial" further should be understood to encompass both microbiocidal and microbiostatic properties. That is, the term comprehends microbe killing, leading to a reduction in number of microbes, as well as a retarding effect of microbial growth.

In various embodiments, the antimicrobial handle cover is considered broad spectrum. The term "broad spectrum" means effectiveness against Gram-positive and Gram-negative bacteria. Gram-positive is effectiveness against *Staphylococcus aureus*, while Gram-negative bacteria is effective against *Salmonella cholerasuis*. In various embodiments, the antimicrobial handle cover is broad spectrum, being effective against bacteria, enveloped and non-enveloped viruses, mycobacteria, and fungi.

In various embodiments, the antimicrobial handle cover creates a physical carrier between the user and a handle, such as a shopping cart handle, that prevents the transfer of infectious microorganisms between the user and the handle.

In some embodiments, the antimicrobial handle cover is configured to slip over any shopping cart handle to protect parents' hands and children from exposure to *salmonella, staphylococcus, Escherichia coli (E. coli), H. influenzae*, COVID-19, and fecal matter.

Another advantage is that, during storage, the surfaces containing the antimicrobial agent remain biostatic to inhibit the growth or multiplication of microorganisms on the handle cover. The spiral corrugated surface of the antimicrobial handle cover provides the ability to hold a greater amount of antimicrobial agent, increasing the effectiveness of the device. Various embodiments provide a handle cover for shopping carts that delivers antimicrobial properties and provides prolonged, long-lasting efficacy against microorganisms without increasing chemical additives.

One feature of the present invention is that the spiral corrugated tube of the antimicrobial handle cover is of an accordion type design. The tube is made up of segments of spiral corrugations. The shape of the segments can change producing in the tube body shape changes of stretching, contracting, bending, twisting, and rotating motions.

Various embodiments provide an antimicrobial handle that is ergonomic and easy to grip—to prevent hands from slipping and sliding off the antimicrobial handle cover.

Various embodiments provide an antimicrobial handle that is flexible to adjust to fit various sizes, types and styles of handles that are designed to be grasped by hand, such as shopping cart handles, basket handles, purse handles, door handles, rail handles, cabinet handles, and tool handles.

As shown in the exemplary FIG. 1, the antimicrobial handle cover 100 is a spiral corrugated tube 102 for covering various types of handles 10 to prevent the spread of pathogens, reduce infections, and effectively kill biofilms relating from the use of frequently contacted surfaces, such as handles. The preferred embodiment of the invention is described and illustrated in the nature of a shopping cart handle cover 10. It will be appreciated, however, that the handle cover of the invention may also take the form to adjust to fit various sizes, types and styles of handles that are designed to be grasped by hand, such as basket handles, purse handles, door handles, rail handles, cabinet handles, and tool handles.

Figure 2:
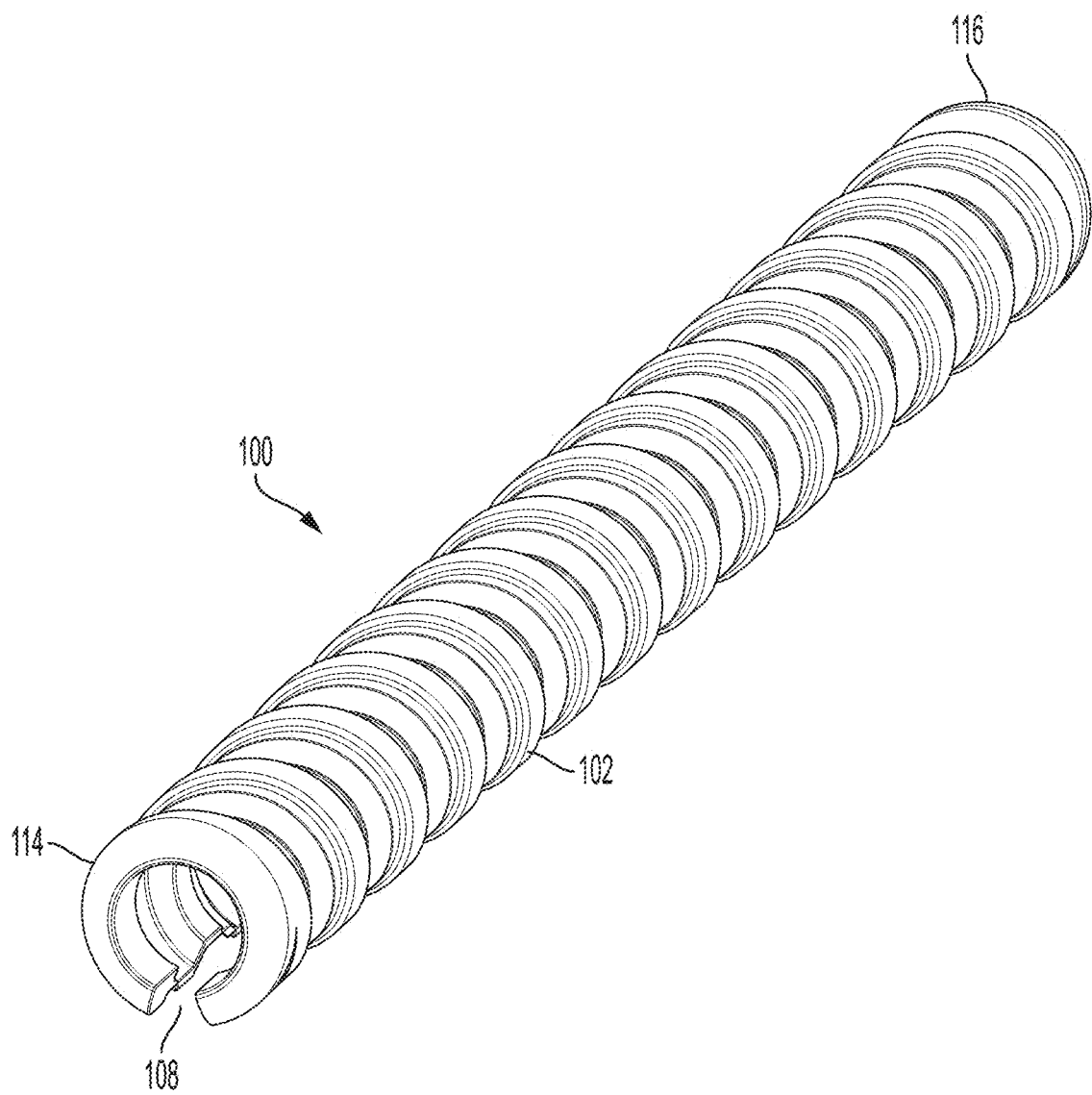
FIG. 2 is a perspective view of the antimicrobial handle cover in an expanded or extended position according to the present teachings.
Figure 3:
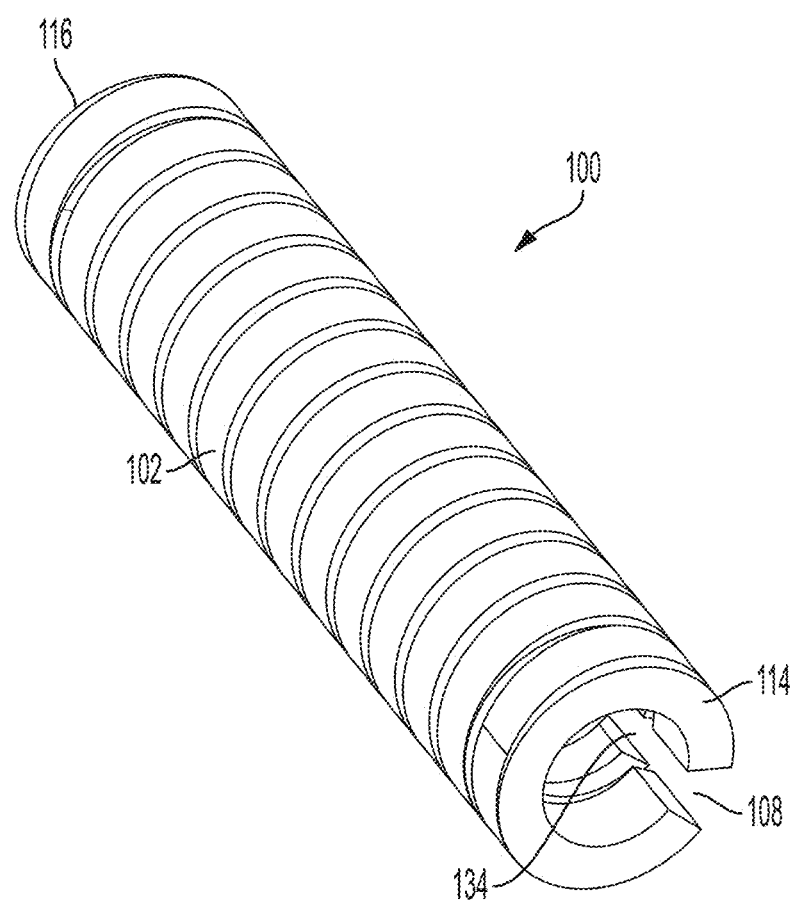
FIG. 3 is a perspective view of the antimicrobial handle cover in a collapsed or unstretched position according to the present teachings.

As shown in FIGS. 2-3, the corrugated tube 102 of antimicrobial handle cover 100 is expandable between a fully compressed position, a fully expandable position, and a plurality of intermediate positions. The corrugated tube 102 is made of flexible material, for example, a polymer, such as silicone. FIG. 2 shows a perspective view of an embodiment of the antimicrobial handle cover 100 in its fully extended position. FIG. 3 shows a perspective view of an embodiment of the antimicrobial handle cover 100 in its collapsed position.

Figure 4:
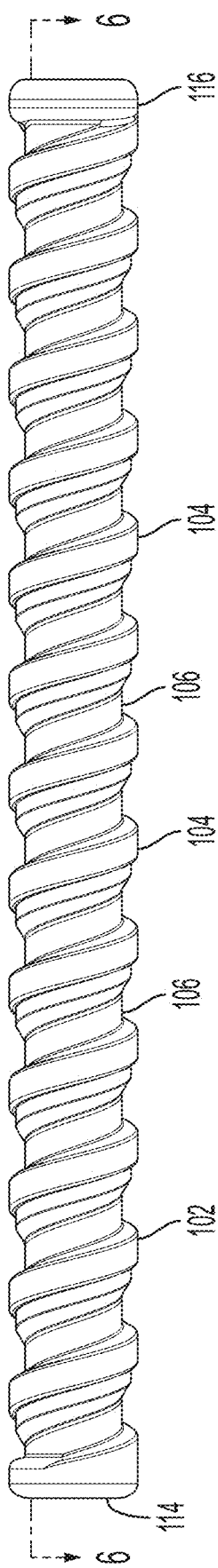
FIG. 4 is a side view of the antimicrobial handle cover in the expanded or extended position according to the present teachings.
Figure 5:
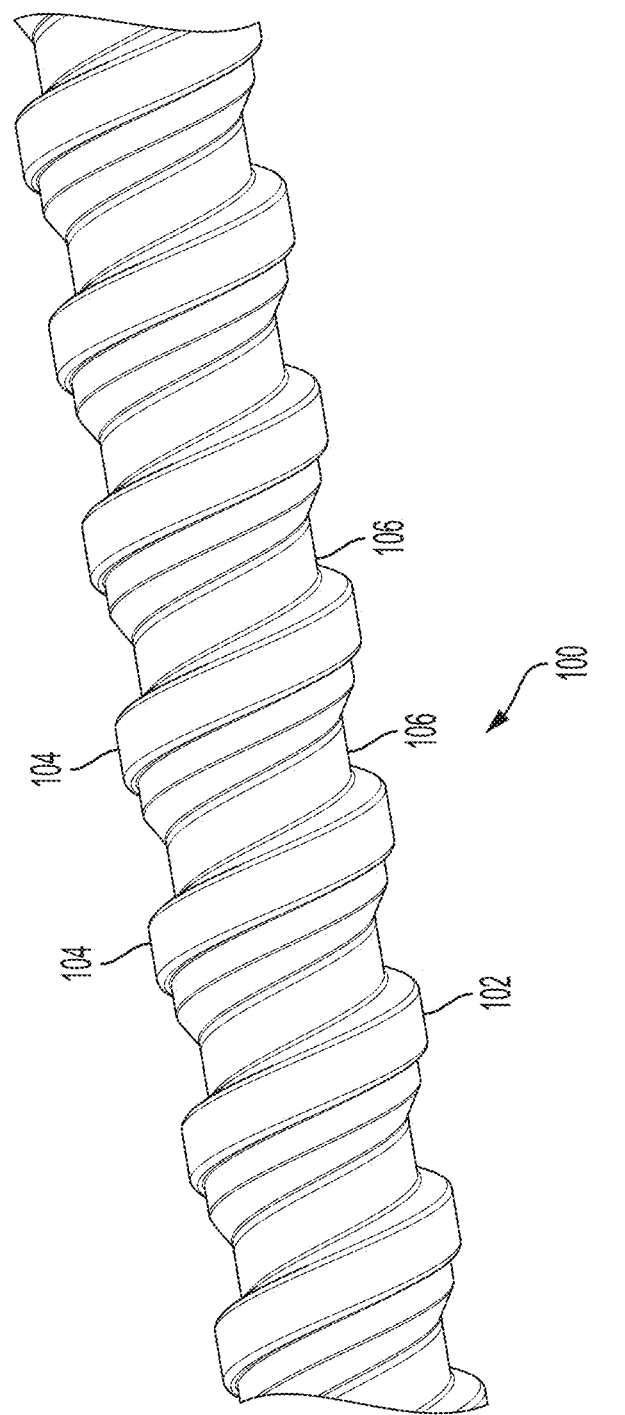
FIG. 5 is a close-up view of the antimicrobial handle cover in FIG. 4.

FIGS. 4-5 show an embodiment of the antimicrobial handle cover 100 in its fully extended position. Corrugated tube 102 extends between first end 114 and second end 116. Ends 114 and 116 are distally axially spaced from each other. In various embodiments, ends 114 and 116 may be configured as knobs or caps attached to the tube for facilitating handling, removal, stretching, contracting, bending, twisting, and rotation of the tube 102. The knobs or caps may be integrally formed with the tube 102 or may be separate components that attach to the tube 102.

Figure 6:
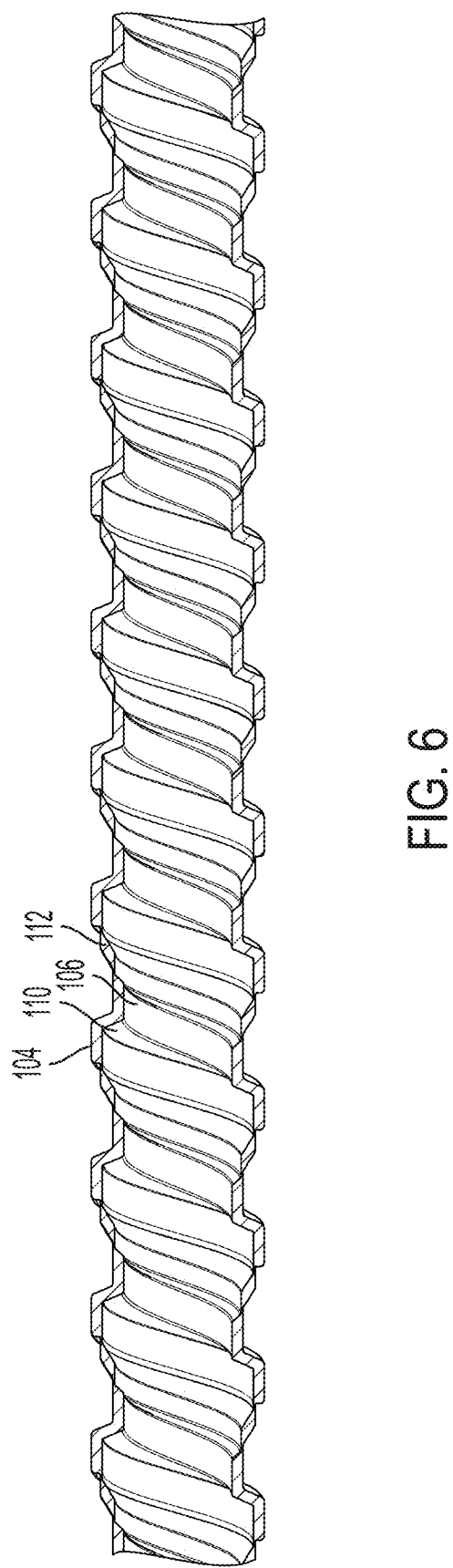
FIG. 6 is a longitudinal cross-sectional view of the antimicrobial handle cover of FIG. 4 taken along line 6-6 of FIG. 4.

As clearly shown in FIGS. 2-5, the corrugated tube 102 includes a tubular body having large diameter spiral ridge corrugations 104, small diameter spiral groove corrugations 106, and a continuous longitudinal slot 108. The spiral ridge 104 and the spiral groove 106 are provided alternately along the axial direction of the tube 102. FIG. 6, which is a longitudinal cross-sectional view, shows that the outer profile of tube 102 comprises a corrugated shape having alternating spiral ridges 104 and spiral groove 106 to define a helically corrugated tube. There are provided interconnecting walls 110, 112 formed between the spiral ridge 104 and the spiral groove 106 to interconnect the large diameter of the ridges 104 and the small diameter of the grooves 106 to form a collapsible sidewall.

Figure 9:
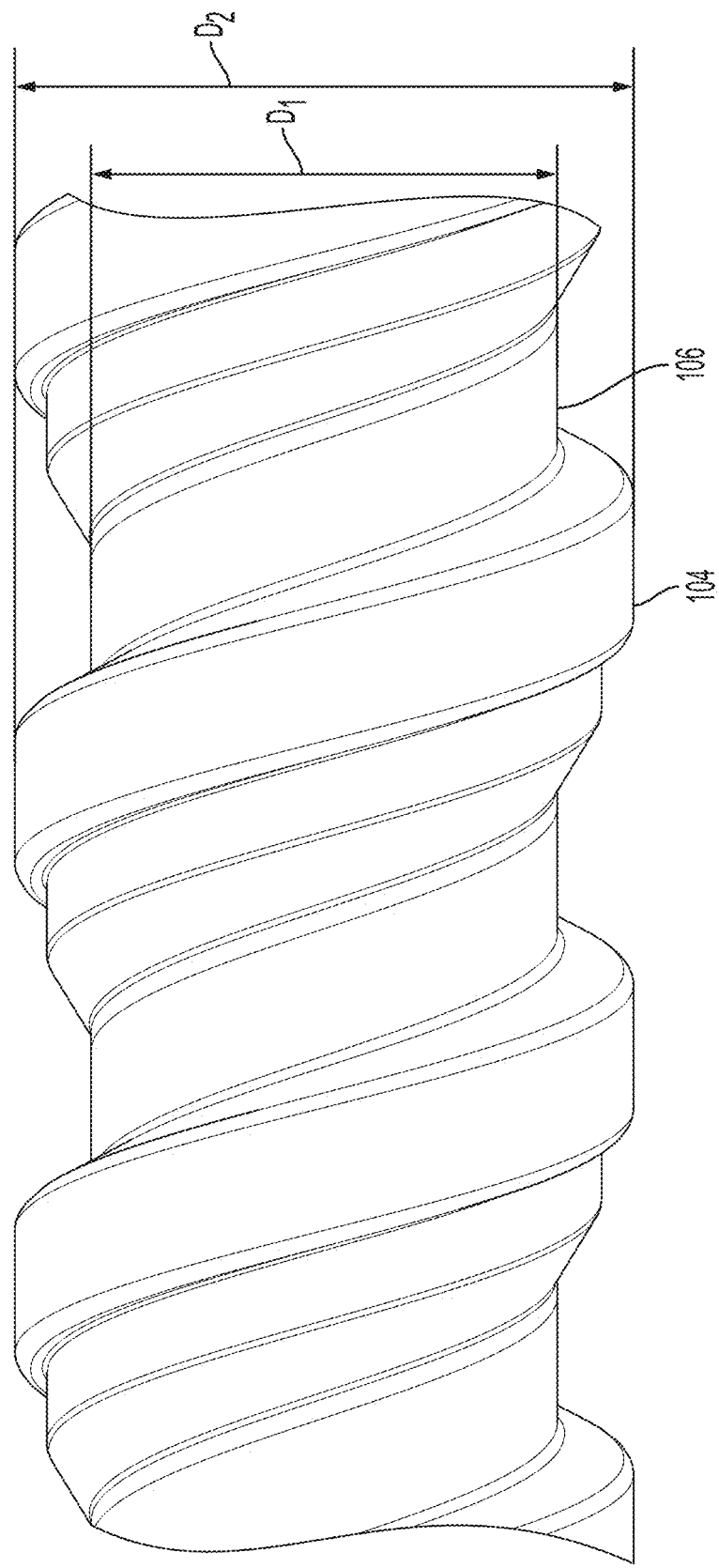
FIG. 9 is an enlarged view of expanded corrugations of the antimicrobial handle cover of FIG. 4.

In an exemplary embodiment, the antimicrobial handle cover 100 has a preferred configuration of 17.64 inches (length)×1.6 inches (width)×1.6 inches (height). However, the particular size and shape of the antimicrobial handle cover will vary depending upon the application. FIG. 4 shows an expanded position of an example of the antimicrobial handle cover 100 having a length of about 17.64 inches. FIG. 9 shows that the exemplary embodiment in FIG. 4 includes spiral grooves 106 having an inner diameter $D_1$ of about 1.0 inches and the spiral ridges 104 having an outer diameter $D_2$ of about 1.6 inches. It should be understood that the dimensions shown and described with reference to the figures herein are nonlimiting and exemplary only. Those skilled in the art would understand that various sizes, shapes, and configurations may be envisioned for the antimicrobial handle cover 100 without departing from the scope of the present teaching. For example, the angle, or pitch, of the spirals may be varied. Different numbers of spirals may be used.

Figure 7A:
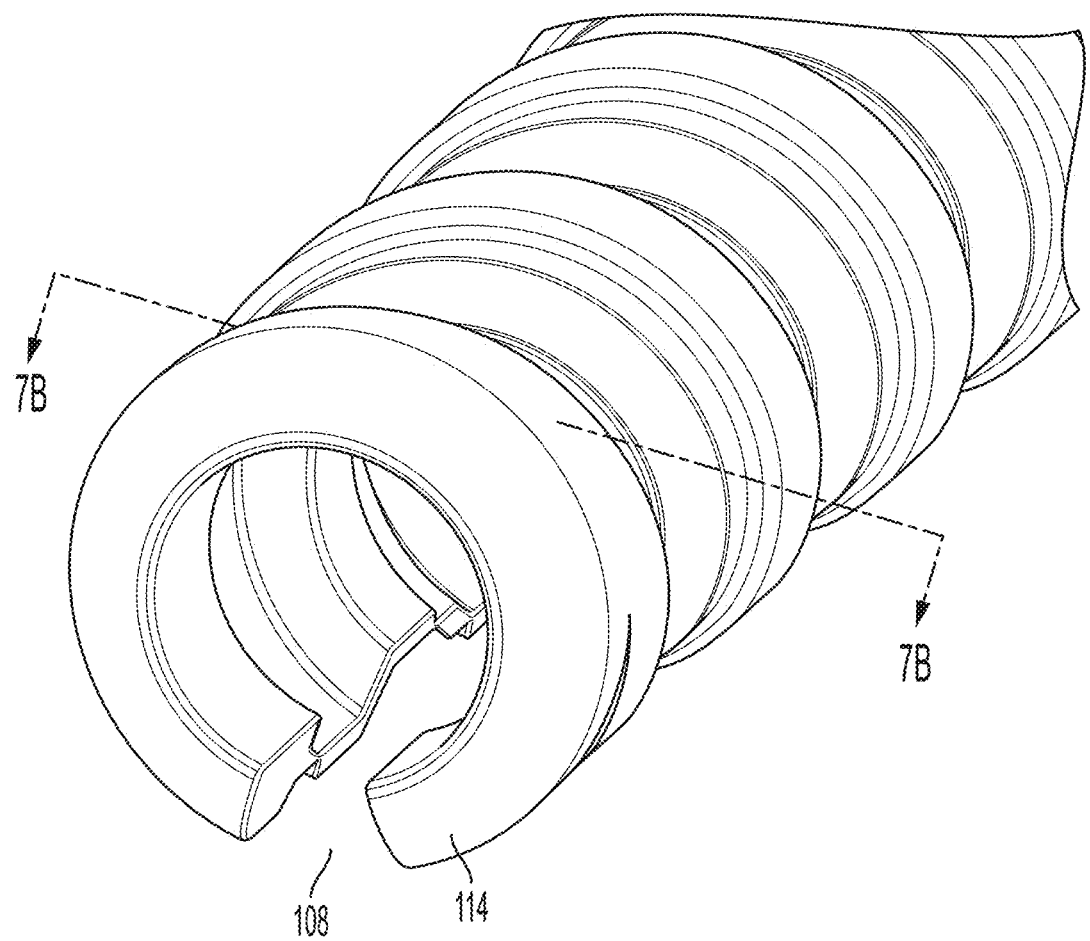
FIG. 7A is a perspective view of an end of the antimicrobial handle cover in FIG. 2 in accordance with the present teachings.
Figure 7B:
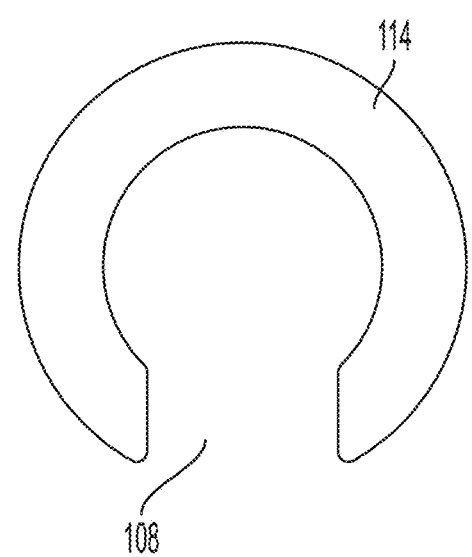
FIG. 7B is a horizontal cross-section view of the antimicrobial handle cover in FIG. 7A taken along line 7B-7B of FIG. 7A.

Referring to FIGS. 7A-7B, slot 108 can be formed in the axial direction over the entire length of the corrugated tube 102 to provide a cut-shape. Slot 108 extends axially along the tube 102 from end 114 to end 116. Thus, tube 102 is shown in FIGS. 7A-7B to be of generally a C-shaped cross-section defining an opening aperture, slot 108, which extends from end 114 to end 116. FIG. 7B is a horizontal cross-sectional view taken along line 7B-7B of FIG. 7A. Alternatively, the cross section may have the shape of an arc, a truncated semi-ellipse, a truncated semi-circle, a parabola, or approximations of those shapes. In various embodiments, slot 108 can be configured as a slit, groove, or a narrow opening extending the entire length of tube 102. When the antimicrobial handle cover 100 is to be fitted on a shopping cart handle 10, the corrugated tube 102 of the antimicrobial handle cover 100 is fitted on the shopping cart handle using slot 108 as an opening such that at least a portion of the shopping cart handle is received therein, as shown in FIG. 1. Conventional handles can be designed to be installed and attached in various directions, and, therefore, the corrugated tube 102 can be bent or twisted in various directions as depicted in FIG. 11 to receive different shapes, sizes, and types of conventional handles therein.

In some embodiments, the antimicrobial handle cover 100 is configured to slip over a shopping cart handle to protect parents' hands and children from exposure to pathogens. As discussed above, the term "pathogen" refers to an agent of disease. The term pathogen as used herein refers to infectious organisms and as the term pathogen is defined in U.S. Pat. No. 9,320,834, which issued on Apr. 26, 2016 and is entitled "HARDENABLE ANTIMICROBIAL COMPOSITION," which is incorporated herein by reference. These include, but are not limited to, viruses, bacteria, fungi, and protozoa. The present invention is useful to kill microbes or inhibit microbial growth. Examples of pathogens include, but are not limited to, *Salmonella, Staphylococcus, E. coli, H. influenzae*, COVID-19, and fecal matter. Pathogens can be transferred to a handle from trace amounts of fecal matter present on unclean hands of individual who previously handled the shopping cart. In various embodiments, the antimicrobial agent inhibits microbial growth in a contaminant on a hard surface, wherein the contaminant is a body matter selected from the group consisting of oils, blood, urine, gastric juice, fecal matter, saline, vomit, human tissue, and mucus.

In the preferred embodiments, an antimicrobial agent is incorporated into the antimicrobial handle cover 100. The antimicrobial ingredients can be contained on the interior surface, exterior surface or both surfaces of the handle cover 100. The antimicrobial handle cover 100 creates a physical barrier between the user and a handle, such as a shopping cart handle 10, that prevents the transfer of infectious microorganisms between the user and the handle. The manufacturing process renders the handle cover 100 antimicrobial to kill infectious microorganisms on the handle cover, on the handle, and on the hands of the user that touches the handle cover.

In various embodiments, the antimicrobial ingredients are uniformly incorporated both on the inner surface and the outer surface of the handle cover 100. In various embodiments, during the manufacturing process, uniform distribution of the antimicrobial agent to a composition enables the process to physically and chemically bond the active antimicrobial ingredients uniformly, to one or more surfaces of the handle cover 100. In other embodiments, different surfaces may have an uneven distribution wherein different quantities of antimicrobial agents are provided thereon. In further embodiments, different areas of a single surface may have differing antimicrobial agent levels.

In the preferred embodiment, the antimicrobial agent is integrated within a composition of a suitable material, for example a polymer, such as, silicone. Alternatively, or conjunctively with the integrated antimicrobial agent, a layer of antimicrobial agent may be adhered uniformly or unevenly to one or more surfaces of the handle cover. In some embodiments, at least one of the surfaces is coated with an antimicrobial agent during the manufacturing process. The terms "adhered" and "coated" as used in the disclosure are intended to include all means of surface treating such that a surface carries the material with which it is coated.

During the manufacturing process, an antimicrobial agent can be added to a polymer compound. Blending the antimicrobial agent into the polymer allows the antimicrobial handle cover 100 to kill or inhibit growth of microorganisms that comes into contact with the handle cover. Another aspect of the invention is a method of manufacturing the antimicrobial handle cover 100 by a process of molding, extruding, additive manufacturing, or 3D printing. Preferably, the antimicrobial handle cover 100 is made from a molding or extrusion process. For example, in addition to polymers, the composition fed into the mold may also contain additives, such as an antimicrobial agent, to produce an antimicrobial polymer. It is preferred to incorporate an amount of antimicrobial on the surfaces of the antimicrobial handle cover 100 that is effective to kill microbes, but safe for user. For example, it is preferred that the antimicrobial agent comprises 0.1% to 50.0% by weight of the polymer.

Any polymer is a candidate for use in the present invention. Examples of polymeric material include various types of silicone or an elastomer. The preferred polymer for the present invention is silicone rubber. Suitable silicone rubbers may include a composition of, for example, room temperature vulcanize, liquid silicone, fluorosilicone, or high-consistency rubber. A comprehensive list of silicone rubber monomers can be found "Silicones", Hardman and Torkelson, Encyclopedia of Polymer Science and Engineering, volume 15, 2nd Edition, pp. 205-308, (1989), John Wiley and Sons, which is incorporated herein by reference.

In some cases, the polymer may be thermoplastic elastomers (TPE). In general, TPEs are polymer materials that exhibit elasticity while remaining thermoplastic. Non-limiting examples of types of TPEs can include styrenics (S-TPE's), copolyesters (COPE's), polyurethanes (TPU's), polyamides (PEBA's), polyolefin blends (TPO's), polyolefin alloys (TPV's), reactor TPO's (R-TPO's), polyolefin plastomers (POP's), polyolefin elastomers (POE's), and olefin block copolymers (OBC). See, for example, U.S. Pat. No. 10,457,805, which issued on Oct. 29, 2019 and is entitled "DAMPING THERMOPLASTIC ELASTOMERS," and, U.S. Pat. No. 9,951,220, which issued on Apr. 24, 2018 and is entitled "THERMOPLASTIC ELASTOMERS COMPOUNDS EXHIBITING SHAPE MEMORY VIA THERMO-MECHANICAL ACTION," which are both incorporated herein by reference.

Any antimicrobial agent known by persons having skill in the art can be used for this invention either individually or in combination of two or more. In some embodiments, different antimicrobial agents may be incorporated into different surfaces of the antimicrobial handle cover. Thus, some surfaces may have differing antimicrobial agents. Preferred for the present invention are antimicrobial metal ions, such as, silver, copper, zinc, gold, platinum, tin, nickel, iron, and manganese. These metal ions are often used in the forms of salts, oxides or as a complex. Additional suitable antimicrobial agents include chlorhexidine, chlorhexidine gluconate, glutaral, halazone, hexachlorophene, nitrofurazone, nitromersol, povidone-iodine, thimerosol, parabens, hypochlorite salts, clofucarban, clorophene, poloxamer-iodine, phenolics, mafenide acetate, aminacrine hydrochloride, quaternary ammonium salts, oxychlorosene, metabromsalan, merbromin, dibromsalan, glyceryl laurate, sodium and/or zinc pyrithione, (dodecyl) (diethylenediamine) glycine and/or (dodecyl) (aminopropyl) glycine; phenolic compounds, polymeric guanidines, quaternary ammonium salts, polymyxins, bacitracin, circulin, the octapeptins, lysozmye, lysostaphin, cellulytic enzymes generally, vancomycin, ristocetin, actinoidins, avoparcins, tyrocidin A, gramicidin S, polyoxin D, tunicamycin, neomycin, and streptomycin. See, for example, U.S. Pat. No. 10,051,867, which issued on Aug. 21, 2018 and is entitled "ANTIMICROBIAL POLYMER CONCENTRATES AND COMPOUNDS," which is incorporated by herein by reference.

Examples of effective antibacterial agents include triclosan, nano-silver dispersions, titanium dioxide, poly (hexamethylene biguanide) (PHMB), benzalkonium chloride, and photo-catalytic grades of titanium dioxide.

All of these polymers, antimicrobial agents, antibacterial agents, or combination thereof can be used, as the above list is not an exclusive one. The agents are incorporated in the ratio and the location that is most effective at destroying microorganisms.

Suitable commercially available polymer, such as silicone, with antimicrobial properties for use in the present invention include, for example, silicone sold under the trademark HR-BIOCIDE™ available from Howren Trading Co., Ltd. of Taiwan. In such an embodiment, the HR-BIOCIDE™ additive is an antimicrobial agent which is specified for silicone rubber products manufacture. Its composition is a transparent network structure carrier and silver ions, intended to kill and inhibit all kind of bacteria and fungus with a sterilization rate of 99.99%. At a slow and controlled rate, HR-BIOCIDE™ releases positively charged silver ions, which absorb tightly onto the cells' wall of bacteria and fungus to destroy their electrolyte balance, penetrates the cell wall, and completely kill the bacterial cells. In other cases, the silver ions rapidly react with the bacterial enzymic activity and suppress its ability to reproduce, thereby killing the bacterial and fungus. The killing and inhibition effects of bacteria and fungus are not damaged by light and heat, does not change color, and its antimicrobial duration and product life cycle are consistent. Under humid conditions, HR-BIOCIDE™ slowly releases a small amount of silver ions to fully exert its antimicrobial function. One key performance properties of HR-BIOCIDE™ is strong killing and inhibition effects on all kind of bacteria and fungus. For use, the preferred level is, for example, 0.5 part of HR-BIOCIDE™ additive per 100 parts (pph) of silicone rubber elastomers.

The handle cover 100 contains an effective amount of an antimicrobial agent to achieve and maintain a biocidal, biostatic, or antimicrobial environment during use or storage. As is well known, antimicrobial agents, which kill microorganisms or substantially reduce the populations, are referred to as "biocidal" substances, while substances which inhibit, slow or retard normal biological growth are referred to as "biostatic" substances.

Figure 8A:
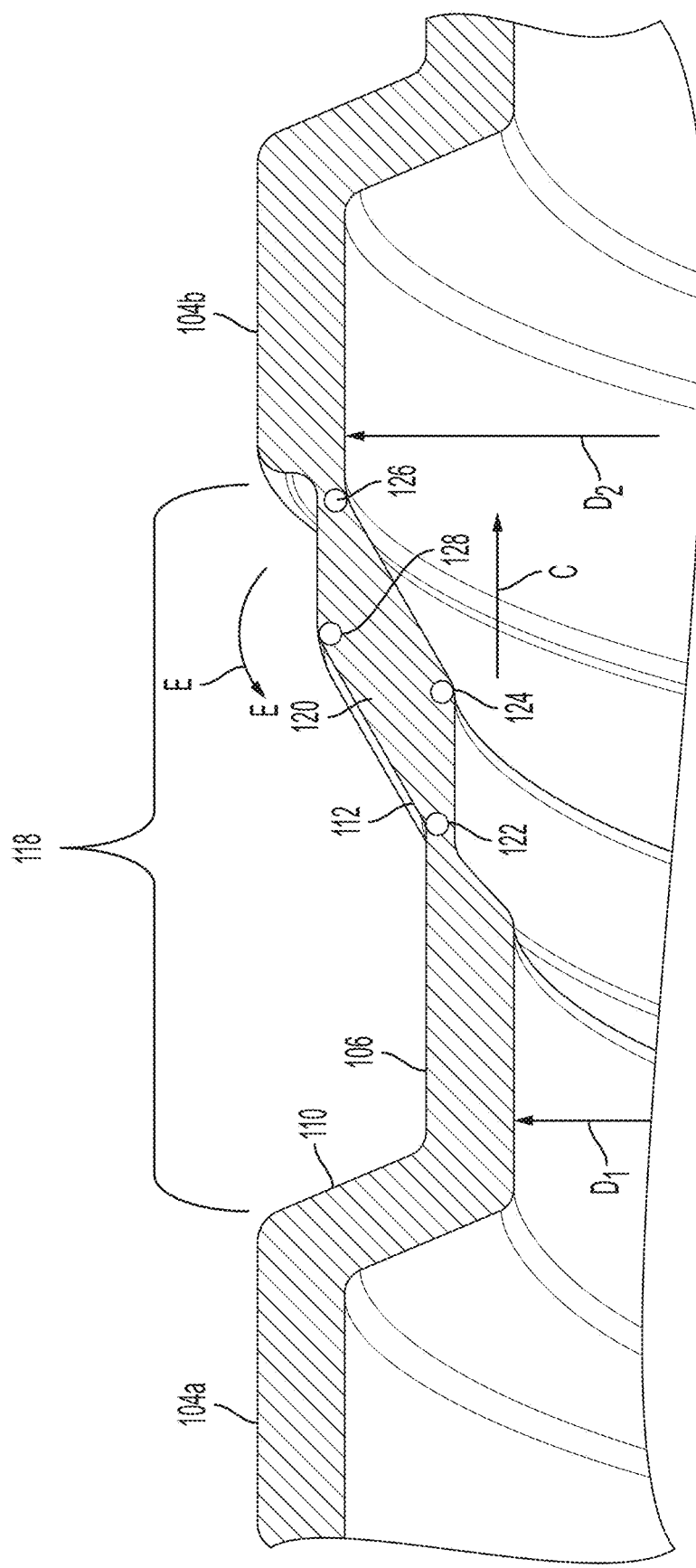
FIG. 8A is an enlarged view of the cross-section of FIG. 6.

Referring now to FIGS. 4-6, and in particular to FIG. 8A, it will be noted that the spiral corrugated tube 102 is of an accordion type design wherein the sidewalls includes spiral ridges 104, spiral groove 106, interconnecting wall 110 and interconnecting wall 112. As best shown in FIG. 8, the sidewall can be divided into a series of small spiral segments 118, each separated by large spiral ridges 104a, 104b. The shape of each small spiral segment 118 is formed by individual small spiral grooves 106 disposed between interconnecting walls 110 and 112. The shape of the small spiral segments 118 can change producing in tube 102 shape changes of stretching, contracting, bending, twisting, and rotating motions. The large spiral ridges 104a, 104b partitioning the small spiral segments 118 reinforce the walls and keep the bending movements smooth. With minimal force or manipulation by the user, these small spiral segment 118 corrugations direct the flexible wall sections to bend, twist, flex, rotate, and collapse in the desired direction and manner when physical force is applied to the ends 114, 116.

Figure 8B:
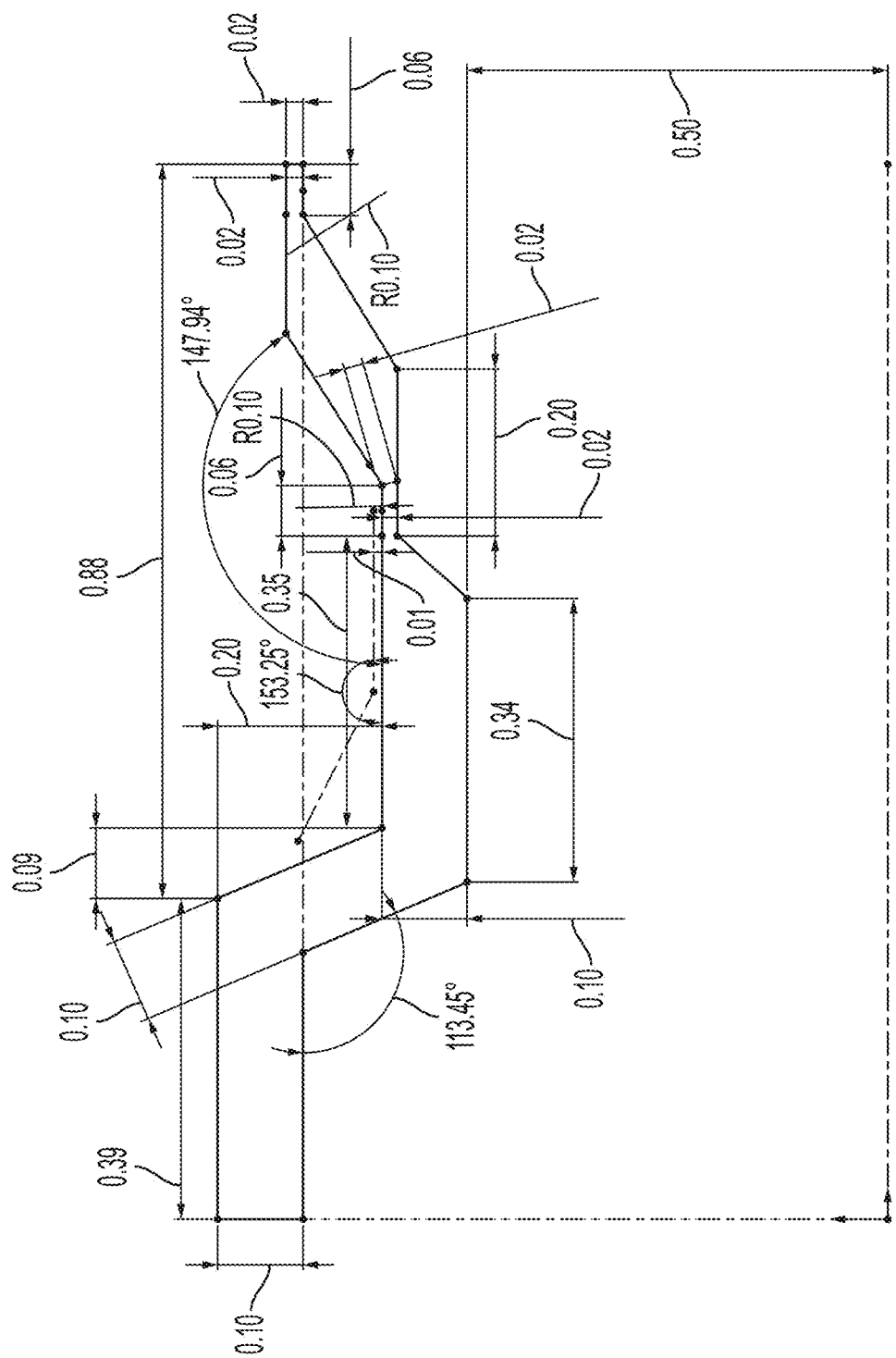
FIG. 8B is a schematic representation of an exemplary antimicrobial handle cover illustration of exemplary dimensions.

As discussed above, the various dimensions of the antimicrobial handle may vary depending on the particular application. FIG. 8B illustrates exemplary dimensions, in inches, of one particular embodiment as shown in FIG. 8A. In FIG. 8B, the angle of the spiral grooves is disposed at an angle of about 113.5 degrees, and the angle of the spiral ridges are disposed at an angle of about 147.94 degrees. Control of the compressibility is also fostered by the fact that the spiral grooves and spiral ridges are disposed at different angles relative to the longitudinal axis of the spiral corrugated tube 102. Those having skill in the art would recognize various angles may be used to control the compressibility of the corrugated tube 102.

FIG. 10 shows the embodiment of the antimicrobial handle cover in a collapsed, unstretched position. To transition from the expanded position (FIG. 8A) to the collapsed position (FIG. 10), the collapsing of the spiral segments 118 of the wall sections relative to each other occurs as each individual flexible spiral wall section folds onto the spiral ridge corrugation section 104b, as a force is applied to both ends 114, 116. The tube 102 is compressed in the collapsed state or a curved state when the corrugations are collapsed such that at least some of the interconnecting walls 112 are folded inward against the connected spiral ridge 104b. The corrugated tube 102 is expanded when the interconnecting walls 112 is folded outward and apart from the spiral ridge corrugation 104b to the greatest extent possible.

As shown in FIG. 8A, the interconnecting wall 112 interconnects the spiral ridge 104b and the spiral groove 106 so that the cross section of interconnecting wall 112 is substantially rhomboid shape 120 defined by—a shape with four sides in which the sides next to each other are not of equal length but the sides opposite each other are of equal length. Corners 122, 124, 126, 128 may define corners of a generally rhomboid or rectangular configuration. As shown in FIGS. 8A and 8B, the rhomboid section 120 includes a first pair of opposing sides (extending from corner 122 to corner 124 and extending from corner 126 to corner 128, respectively) and a second pair of opposing sides (extending from corner 122 to corner 128 and extending from corner 124 to corner 126, respectively). The second pair of opposing sides extends between the first opposing sides. The second pair of opposing sides has a length greater than the first pair of opposing sides. As best shown in FIG. 8B, a pair of longitudinal members extends from the rhomboid section 120. The pair of longitudinal member includes a first longitudinal member extending from a top position of the rhomboid section 120 and connects to the adjacent spiral ridge 104. A second longitudinal member extends from a bottom position of the rhomboid section 120 in a direction opposite the first longitudinal member and connects to the adjacent spiral groove 106. As depicted in the exemplary dimensions of FIG. 8B, the length of the first and second longitudinal members is approximately 0.06 inches and the thickness is approximately 0.02 inches. Thus, the length of the longitudinal members is approximately thrice as long as thick to facilitate the compressibility of the tube 102.

This rhomboid configuration 120 is particularly advantageous in collapsing the tube 102 in that by applying axially compressive forces on the ends 114, 116 of the antimicrobial handle cover 100, the bottom of rhomboid configuration 120 will readily move toward the spiral ridge 104b in the direction of arrow C to which the interconnecting wall 112 connects while causing the top of rhomboid configuration 120 to reverse fold backward in the direction of arrow E onto spiral groove 106 in the manner best shown in FIG. 10. As a result, interconnecting wall 112 is folded back upon the spiral groove 106 to form a reverse fold to nest between the spiral groove 106 and spiral ridge 104b in response to a compression movement of ends 114, 116. For example in FIG. 10, in the sidewall 130, 132 in the collapsed position, interconnecting wall 112 is reversed folded backward in the direction of the spiral groove 106 so as to overlie the spiral groove 106, whereby the reversely folded interconnecting wall 112 is positioned above the spiral groove 106. As shown in FIG. 10 in the sidewall 130, 132, the reversely folded interconnecting wall 112 nests between spiral groove 106 and spiral ridge 104b substantially parallel to each other so the surfaces 106, 112, 104 are aligned in a stacked manner as shown in FIG. 10' in region 140, which will be described in further details below. In other embodiments, the reversely folded interconnecting wall 112 is reversed folded backward so as to overlie the spiral groove 106 as a slightly angled wall. In such embodiments, the interconnecting wall 112 may be provided at an angle of between 0 degrees-45 degrees relative to groove 106 or spiral ridge 104b.

Referring to FIG. 8A, the spiral configuration provides an ergonomic handle cover for manipulating the antimicrobial handle cover 100. The ergonomic design of the corrugation shaped tube 102 further provides an easy grip to prevent the user's hand from slipping and sliding off the antimicrobial handle cover 100. For example, the exemplary segment 118, which is shown in FIGS. 8A-8B to comprise interconnecting wall 110, spiral grooves 106, and interconnecting wall 110, are greater in width than the spiral ridges 104b so as to constitute convenient rests or seats for the fingers of the user's, thereby insuring against relative movement, slippage or twisting during use. In some embodiments, the width of spiral groove 106 can be from about 0.25 inches to 0.50 inches, the width of spiral ridge 104b can be from about 0.25 inches to 0.50, the width of interconnecting wall 110 can be from about 0.05 inches to 0.15 inches, and the width of interconnecting wall 112 can be from about 0.15 inches to 0.50 inches. In the preferred exemplary embodiment shown in FIGS. 8A-8B, the width of spiral groove 106 may be about 0.34 inches, the width of spiral ridge 104b may be about 0.39 inches, the width of interconnecting wall 110 may be about 0.09 inches, and the width of interconnecting wall 112 may be about 0.21 inches.

When in use and during storage, the combination of the spiral corrugated tube 102 configuration and the antimicrobial properties provides several advantages to the antimicrobial handle cover 100 in both the expanded position and the collapsed position. As described above, in various embodiments, antimicrobial ingredients can be uniformly incorporated throughout the entire handle cover 100, including both on an inner surface 136 and an outer surface 138 depicted in FIG. 10. In other embodiments, different surfaces may have different quantities of antimicrobial agents. In further embodiments, different areas of a single surface may have differing antimicrobial agent levels. For example, in some embodiments, the inner surface 136 of the antimicrobial handle cover 100 that is in direct contact with the shopping cart 10 handle may be manufactured to have an antimicrobial level greater than the outer surface 138 that is contacted by the user.

In the shopping cart example, it is commonly known that biofilms can form on shopping cart handles. Biofilms can persist on surfaces for long periods and are difficult to kill. Studies have shown that if a surface is colonized by a biofilm, the problem will inevitably get worse, and the aging biofilm will become increasingly difficult to kill or reduce. Old biofilms have been shown to be even less susceptible to antimicrobial agents than are younger biofilms. When conventional handle covers are employed, contamination of the surfaces can happen, which can ultimately lead to infection. When in use, the inner surface of a conventional handle cover directly contacts the handle and microbes thereon. In some cases, difficult to kill microorganisms, such as biofilms, on a handle may be reduced by a conventional handle cover but may not be completely destroyed. Thus, some of the microbes may be transferred from the handle to the inner surface of the conventional handle cover. Conventional shopping cart handles are not able to reliably kill microorganisms, especially biofilms, once they contaminate the surfaces. Therefore, these organisms are free to continue to grow on some conventional handle covers and ultimately cause an infection to the user. Microorganisms can adhere and accumulate within complex shaped areas, small-curved areas, or tight areas, such as internal junctures of two or more walls, for examples in tight corners. The organisms can multiply, spread, and cause an infection. Once contaminated, conventional reusable handle covers are often difficult to completely clean and sanitize.

In contrast, in the present invention, the spiral corrugated surface of the antimicrobial handle cover 100 provides the ability to hold a greater amount of antimicrobial agent, increasing the effectiveness of the device. The antimicrobial properties of the present invention provide an effective, broad-spectrum antimicrobial functionalization to the surface of the antimicrobial handle cover 100. This prevents biofilm formation, which typically serves as the reservoir for pathogens that cause infections.

The spiral corrugated tubing 102 design of the antimicrobial handle cover 100 increases the effectiveness of the antimicrobial properties without the need to increase the concentration level of antimicrobial additive, in comparison to conventional smooth surface tubular handle covers. The corrugated tubing 102 of antimicrobial handle cover 100 accomplishes this in several ways: (1) by providing a high surface area, and (2) by providing a cumulative effect of the antimicrobial properties.

Should any microorganisms be transferred to the inner surface of the antimicrobial handle cover 100 when removed from the handle, the design of the present invention enhances the effectiveness of the antimicrobial properties both longitudinally along the length of the tube and within tight spaces of the tube. First, along the length of the antimicrobial handle cover 100, the tubes 102 are corrugated to increase the total surface area of the tube. The additional surface area provided by the corrugations 104, 106 increases the antimicrobial properties along the entire length of the tube 102. This embodiment of the present invention provides both a greatly increased surface area and also enables a greater volume or amount of antimicrobial agent to be incorporated in the tube 102 in comparison to conventional handle covers having smooth surface tubular designs.

In the collapsed position due to the corrugations, the amount of antimicrobials on the inside of the tubing increases, where it is most effective, without the need to increase the concentration level of antimicrobial additive. When removed from the handle for storage, the spiral corrugated configuration enables the handle cover 100 to collapse and form a tubular enclosure that is partially-opened along the slit 108 extending longitudinally and having an interior cavity 134 therein as shown in FIGS. 3 and 10. In the collapsed position, the sidewalls 130, 132 of the antimicrobial handle cover contract such that the inside surfaces 136 of the spiral grooves 106 define an interior cavity 134. The sidewalls 130, 132 compress longitudinally and trap any remaining microorganisms along the surfaces of the sidewalls 130, 132, which effectively increases the contact of the antimicrobial agent with the microorganism. An increase in biofilm killing is accomplished when the exposure to the amount of antimicrobial agent and duration of contact time is increased. The more antimicrobial agent in the present invention that contacts the microorganisms will cause more microorganisms to stagnate or die, and less antimicrobial agent in conventional devices may allow the microorganisms to multiply. In storage, the antimicrobial handle cover 100 provides an enclosure that both encloses and traps any microorganisms that remains on the surface when in the collapsed position to provide a prolonged contact time to kill the microorganisms.

The microorganisms die after being in contact with the antimicrobial agent along the inner surface 136 for a period of time. Thus, the dead microorganisms will not multiply and will not cause an infection to the user. This feature is beneficial for consolidating the increased antimicrobial agent due to the high surface area on the inner surface 136 to kill microorganisms that may remain after the handle cover 100 is removed from the handle and placed in the collapsed position.

Another disadvantage of conventional corrugated tubing is that the inner corrugations can sometimes trap substances, such as microbes or debris, in the ridges. Such tight or confined regions are potential spaces in which microorganisms can collect when conventional tubes are collapsed for extended periods, and which can lead to formation of biofilms and potentially resulting infection.

Referring to FIGS. 10 and 10', to overcome this shortcoming of conventional tubes, another advantage of the present invention is that folding of the interconnecting wall 112, as described above, in the collapsed or folded position establishes temporary sealing regions 140 to also achieve and maintain the biocidal, biostatic, or antimicrobial environment of the handle cover 100 in the collapsed or folded position. The temporary sealing region 140 is formed when the interconnecting wall 112 folds back onto spiral groove 106 such that spiral groove 106 is positioned between spiral groove 106 and spiral ridge 104b, in a substantially stacked manner. When these surfaces of the interconnecting wall 112, spiral groove 106, and spiral ridge 104b are in contact with one another in the collapsed position, they combine to form an overlapping sealing region 140; thus, providing a temporary sealing surface. The interconnecting wall 112, spiral groove 106, and spiral ridge 104b overlap and contact at least some portions of each other within the sealing region 140.

The cumulative effect of the plurality of surfaces 112, 106, 104b which individually contain an antimicrobial agent, but together form the temporary sealing region 140. Thus, the resulting temporary sealing region 140 is the cumulative result of the surfaces 112, 106, 104b being aligned in a stacked manner to form the sealing region 140.

The sealing region 140 provides a restricted space in which microorganisms can be trapped between the surfaces of the interconnecting wall 112, spiral groove 106, and spiral ridge 104b. The antimicrobial agent on the surfaces of the interconnecting wall 112, spiral groove 106, and spiral ridge 104b is configured to kill microorganisms within the temporary sealing region 140. The temporary sealing regions 140 are designed to trap and confine the antimicrobial agent between the surfaces of the interconnecting wall 112, spiral groove 106, and spiral ridge 104b so that microorganisms are exposed to a high cumulative amount of antimicrobial agent.

The high cumulative amount of antimicrobial agent is provided to tight spaces inside of tube 102, especially corners, due to the aggregate of the antimicrobial agent provided on the surfaces of the sealing region 140. Namely, in the example of FIG. 10', the stacked configuration provides a cumulative amount of antimicrobial agents in the sealing region 140 that is an aggregate of three antimicrobial surfaces 106, 112, 104b. This results in a higher amount of antimicrobial agents in the sealing region 140 in comparison to conventional handle covers. Thus, the antimicrobial agent in the temporary sealing region 140 is at a higher amount for a sufficient contact time to target and kill microorganisms, especially biofilms, that may adhere directly at these surfaces in the region 140. This demonstrates how the invention can create a very high microbe kill efficacy while at the same time providing a small amount of antimicrobial for user safety.

Additionally, a number of different examples of antimicrobial agents can be used with the various embodiments described herein. The antimicrobial compositions should kill and/or provide stasis of Gram-positive and Gram-negative bacteria and fungi. The agents may also have efficacy at killing organisms within an established biofilm and/or degrading the extracellular matrix of the film. However, this is not necessary for the invention to be beneficial because the invention is designed to kill organisms before they have an opportunity to form a biofilm and cause subsequent infections.

In the preferred embodiment, the antimicrobial agent can be selected that will be effective against the microbe causing an infection, but it will be safe for the user and the intended application. The antimicrobial efficacy of the antimicrobial agent can be selected based on the Minimum Inhibitory Concentration (MIC) and the Minimum Bactericidal Concentration (MBC). The MIC is defined as the lowest concentration of an antimicrobial agent needed to stop a microbe from multiplying. The MBC is defined as the lowest concentration of an antimicrobial agent needed to kill the microbe. The MBC represents at least a 99.9% reduction of the initial bacterial population. According to studies, frequently for antibacterial polymers, the MIC and MBC values are identical or very similar are described in Ergene et al., *Polym. Chem.*, 9: 2407 (2018).

The antimicrobial activity of the present invention can be affected by the concentration of active ingredients. In various embodiments, surfaces of the antimicrobial handle cover 100 according to the present invention can be controlled by varying the concentration of the antimicrobial agent based on the specific application. For example, a handle cover for a shopping cart may be designed with a different concentration level than a handle cover for a hand railing installed in an industrial or medical facility.

In one exemplary embodiment, an antimicrobial agent can be incorporated into one or more of the above polymers as a plastic additive to produce antimicrobial handle cover 100. One skilled in the art without undue experimentation can determine the appropriate concentration for the intended use of the antimicrobial handle cover 100. According to one example, the antimicrobial handle cover 100 may be formed from a material that contains an antimicrobial at a concentration in a range from about 0.01 pph to about 20 pph. The preferred range of the concentration of antimicrobial for the polymer compounds can be in the range from about 0.25 pph to about 10 pph; more preferably about 0.50 pph to about 1 pph.

According to the present invention, the minimum concentration of antimicrobial agent for the intended use of the antimicrobial handle cover 100 can be selected by the MBC, which is the lowest concentration that kills 99.9% of the initial bacterial. For example, in various embodiments, the selected antimicrobial agent should inactive a variety of microorganisms after 10 seconds to 1 hour of contact time. In various embodiments, the antimicrobial agent has a broad spectrum of antimicrobial activity and kills dried or fixed organisms and biofilms on surfaces. In various embodiment, the antimicrobial agent is a bactericide, tuberculocide, fungicide, virucide, sporicide, or a combination thereof.

The presence of the spiral corrugations of tube 102 improves the tube body shape changeability of stretching, contracting, bending, twisting, and rotating motions during use. In one aspect, this feature of the present invention is that the corrugated tube 102 is employed wherein each corrugation is capable of being positioned in a maintainable expanded rest position and a maintainable compressed rest position. This feature has the advantage of enabling the user to vary the length of the tube 102 to suit a particular handle. Conventional handles, for example, shopping cart handles, basket handles, purse handles, door handles, rail handles, cabinet handles, and tool handles, can be designed to be installed and attached in various directions, and, therefore, the corrugated tube 102 can be bent or twisted in various directions to receive different shapes, sizes and types of conventional handles therein.

Namely, in various embodiments, the angle of rotation of the corrugated tube 102 is such that sections of the tube can be folded or bent that positions sections adjacent to each other. In various embodiments, the corrugated tube 102 defines at least one bend, each bend defining an angle of about 90 degrees or about 180 degrees. The sum of angles of the bends may exceed 180 degrees or 360 degrees. The sections may be parallel and/or laterally adjacent to each other. The adjacent sections may be formed by at least one bend, such as a 180 degree bend. In such an embodiment, the corrugated tube 102 may be bent in a substantially U-shape, with a pair of substantially parallel sections being connected by a bend defining an angle of about 180 degrees.

In some cases, the corrugated tube 102 can be bent having a shape other than a U-shape, for example, a S-shape. A first bend and a second bend may together form an S-shape. The angle of the bends can be variable to form the desired shapes. For example, the angles of the one or more bends can be an acute angle, a right angle, an obtuse angle, a reflex angle, or a combination thereof depending on the desired orientation and/or configuration of the corrugated tube 102. Additionally, the spiral corrugated tube 102 enables the antimicrobial handle cover 100 to be compressed during storage to reduce the amount of space required during storage, but permits the tube to be expanded during use, to extend to a length that accommodates various handles.

Another advantage is that the spiral corrugated configuration of the antimicrobial handle cover 100 can allow the user to safely grasp, remove and collapse the handle cover 100 without having to contact any transferred microorganisms that may remain on the inner surface 136. The user can easily grip ends 114, 116 as a gripping portion, the outer surface 138, or a combination thereof to remove the handle cover 100 from the handle 10 without contacting the inner surface 136. Thus, the spiral corrugated configuration allows a user to safely remove the antimicrobial handle cover 100 from the handle 10 for storage while avoiding having to touch any surface that had direct contact with the handle.

The antimicrobial handle cover 100 can be designed to be machine-washable so that it can be cleaned using a dishwasher. In various embodiment, the antimicrobial handle cover 100 comprises a reusable, dishwasher-safe, silicone or silicone-like material to prevent unsanitary conditions from forming.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The foregoing detailed description of one or more exemplary embodiments of the system, method and device of the antimicrobial handle cover has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems, or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A handle cover for shopping carts, comprising:
   a collapsible corrugated tube comprising a tube body of a tubular shape defining spiral corrugations having a plurality of spiral ridges and a plurality of spiral grooves, which are arranged alternately running transverse to a length of the tube;
   a slot formed longitudinally along the length of the tube from a first end to a second end; and
   at least one antimicrobial agent is impregnated throughout the tube for inhibiting growth of microbes;
   a flexible sidewall having the slot formed therein and connecting the first end and the second end and the flexible sidewall is divided into a series of spiral groove segments extending from the first end to the second end, each spiral groove segment includes a rhomboid section formed between a spiral groove and a spiral ridge and a pair of longitudinal members;
   the rhomboid section includes:
      a first pair of opposing sides, and
      a second pair of opposing sides extending between the first opposing sides, wherein the second pair of opposing sides has a length greater than the first pair of opposing sides; and
   the pair of longitudinal members includes:
      a first longitudinal member extending from a top position of the rhomboid section and connected to the spiral ridge;
      a second longitudinal member extending from a bottom position of the rhomboid section in a direction opposite the first longitudinal member and connected to the spiral groove; and
      wherein a length of the first and second longitudinal members is approximately thrice as long as thick.

2. The handle cover according to claim 1, wherein the at least one antimicrobial agent inhibits microbial growth of one or more of the following microorganism: *E. coli, Listeria, Salmonella, Staphylococcus, Streptococcus, H. influenzae* and COVID-19.

3. The handle cover according to claim 1, wherein the at least one antimicrobial agent inhibits microbial growth in a contaminant contacting at least one surface of the tube, wherein the contaminant is a body matter selected from the group including oils, blood, urine, gastric juice, fecal matter, saline, vomit, human tissue, and mucus.

4. The handle cover according to claim 1, wherein the at least one antimicrobial agent prevents or reduces the growth or proliferation of microorganisms or inhibits biofilm formation on at least one surface of the tube.

5. The handle cover according to claim 1, wherein the at least one antimicrobial agent kills biofilm and the microbes selected from the group including bacteria, bacteria spores, fungi, viruses, and a combination thereof.

6. The handle cover according to claim 1, wherein the at least one antimicrobial agent is evenly impregnated throughout the tube.

7. The handle cover according to claim 1, wherein some surfaces of the tube are impregnated with differing amounts of the at least one antimicrobial agent.

8. The handle cover according to claim 1, wherein the at least one antimicrobial agent is incorporated uniformly to one or more surfaces of the handle cover.

9. The handle cover according to claim 1, wherein the at least one antimicrobial agent is incorporated unevenly to one or more surfaces of the handle cover.

10. The handle cover according to claim 1, wherein a first interconnecting wall and a second interconnecting wall are formed within the spiral groove segment; and
　　wherein the tube is adjustable between an expanded position and a collapsed position.

11. The handle cover according to claim 10, wherein, when in the collapsed position, the second interconnecting wall is rotated in a folded-backward direction to cover the spiral groove to form a reverse fold wall such that the second interconnecting wall nests between the spiral groove and a connecting adjacent spiral ridge within a sealing region in response to a compression movement of the first and second ends of the tube to form a temporary substantially tight seal within the sealing region to trap the microbes therein.

12. The handle cover according to claim 11, wherein at least two surfaces of the second interconnecting wall, the spiral groove, and the connecting adjacent spiral ridge are configured to overlap within the sealing region and provide a cumulative antimicrobial effect based on combined antimicrobial properties of each of the at least two surfaces to increase effectiveness of the at least one antimicrobial agent within the sealing region; and
　　wherein the sealing region is configured to trap the microbes therein to increase exposure to the combined antimicrobial properties within the sealing region.

13. The handle cover according to claim 10, wherein the first interconnecting wall and the second interconnecting wall are disposed at different angles relative to a longitudinal axis.

14. The handle cover according to claim 10, further comprising at least one finger gripping surface formed by the spiral groove segment; and
　　wherein the at least one finger gripping surface is configured having a width greater than a width of a spiral ridge.

15. The handle cover according to claim 10, wherein the second interconnecting wall comprises the rhomboid section between and connecting the spiral groove and the adjacent spiral ridge.

16. The handle cover according to claim 10, wherein the second interconnecting wall comprises the rhomboid section; and
　　the rhomboid section is dimensioned to facilitate collapsing of the tube, wherein a first adjacent spiral ridge and the spiral groove collectively converge towards a second adjacent spiral ridge as the second interconnecting wall rotates in a counterclockwise direction to overlap the spiral groove.

17. The handle cover according to claim 1, wherein the spiral grooves are disposed at a first angle in a first range from about 110 degrees to about 115 degrees and the spiral ridges are disposed at a second angle in a second range from about 145 degrees to about 150 degrees relative to a longitudinal axis.

18. The handle cover according to claim 1, wherein the tube is made of one or more materials selected from the group including: at least one polymer, a silicone polymer, and at least one thermoplastic elastomers (TPE).

19. The handle cover according to claim 1, wherein the tube has a generally helical longitudinal geometry and a C-shaped horizontal cross-section.

20. The handle cover according to claim 19, wherein the C-shaped horizontal cross-section is selected from the group including an arc, a truncated semi-ellipse, a truncated semi-circle, and a parabola.

21. The handle cover according to claim 1, wherein the tube is an accordion-type tube operable to retain itself in an expanded position and a collapsed position.

22. A handle cover, comprising:
　　a thermoplastic tube having a longitudinal axis extending between a first end and a second end;
　　a corrugated region extending between the first end and the second end, the corrugated region comprises accordion corrugations including a plurality of spiral-shaped ridges interspersed with a plurality of spiral-shaped grooves;
　　a slot formed longitudinally along a length of the tube from the first end to the second end;
　　at least one antimicrobial agent is impregnated throughout the tube for killing biofilm and microbes;
　　a flexible sidewall having the slot formed therein and connecting the first end and the second end and the flexible sidewall of the tube is divided into a series of spiral groove segments extending from the first end to the second end, each spiral groove segment residing between two adjacent spiral ridges;
　　a first interconnecting wall and a second interconnecting wall are formed within the spiral groove segment;
　　the second interconnecting wall comprises a rhomboid section between and connecting a spiral groove and the adjacent spiral ridge; and
　　the rhomboid section includes:
　　　　a first pair of opposing sides, and
　　　　a second pair of opposing sides extending between the first opposing sides, wherein the second pair of opposing sides has a length greater than the first pair of opposing sides; and
　　the pair of longitudinal members includes:
　　　　a first longitudinal member extending from a top position of the rhomboid section and connected to the spiral ridge;
　　　　a second longitudinal member extending from a bottom position of the rhomboid section in a direction opposite the first longitudinal member and connected to the spiral groove; and
　　　　wherein a length of the first and second longitudinal members is approximately thrice as long as thick.

23. The handle cover according to claim 22, wherein the tube is adjustable between an expanded position and a collapsed position; and
　　wherein the spiral grooves are disposed at a first angle in a first range from about 110 degrees to about 115 degrees and the spiral ridges are disposed at a second angle at a second range from about 145 degrees to about 150 degrees relative to a longitudinal axis.

24. The handle cover comprising according to claim 22, wherein the slot is configured to receive a handle, wherein the handle is selected from the group including a shopping cart handle, a basket handle, a purse handle, a door handle, a rail handle, a cabinet handle, and a tool handle.

* * * * *